Patented Apr. 21, 1925.

1,534,525

UNITED STATES PATENT OFFICE.

MAX HARTMANN AND JOHANN KÄGI, OF BASEL, SWITZERLAND, ASSIGNORS TO SOCIETY OF CHEMICAL INDUSTRY IN BASLE, OF BASEL, SWITZERLAND.

ACYLATED DIAMINES.

No Drawing.   Application filed July 2, 1924.   Serial No. 723,795.

*To all whom it may concern:*

Be it known that we, MAX HARTMANN and JOHANN KÄGI, both citizens of the Swiss Confederation, and residing at Basel, Switzerland, have invented new and useful Improvements in Acylated Diamines, of which the following is a full, clear, and exact specification.

The invention relates to the manufacture of acylated alkylenediamines of the formula:

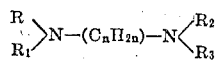

(wherein R means H or acyl, $R_1$ means acyl, $R_2$ and $R_3$ mean H or a hydrocarbon radical, such as alkyl, aryl, and $n$ means a whole number) and consists in treating alkylenediamines of the formula:

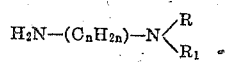

(wherein R and $R_1$ represent H or a hydrocarbon radical and $n$ means a whole number) with acylating agents.

As acylating agents there may be mentioned, on the one part, the acid-anhydrides and halides which, when necessary, may be employed in presence of agents that bind acid, and which are particularly suitable for the production of mono- or di-acyl derivatives of unsymmetrical di-substituted alkylenediamines, and, on the other part, the free acids or acid esters which are principally applicable for the manufacture of monoacylated derivatives of unsubstituted or substituted alkylenediamines.

When an acid-halide or anhydride is allowed to act on unsymmetrical substituted alkylenediamines, preferably in water or another solvent, and if necessary in presence of an alkali, there is obtained according to the quantitative proportions a mono- or un-symmetrical di-acyl-derivative as illustrated by the following formulæ, R meaning a hydrocarbon radical as for instance alkyl, aryl, etc., $R_1$ meaning a hydrocarbon radical as for instance alkyl, etc.—

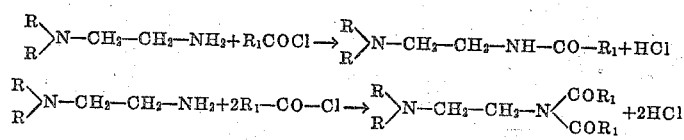

The mono-acyl-derivatives of all the alkylenediamines may also be obtained by heating one molecular proportion of acid or acid ester with at least one molecular proportion of diamine, water or alcohol being eliminated as illustrated by the following formula, R meaning H or a hydrocarbon radical as for instance alkyl, aryl, etc., $R_1$ meaning a hydrocarbon radical as for instance alkyl, etc.—

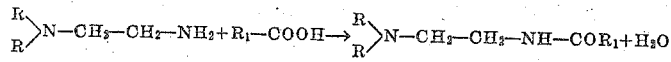

The new compounds are oils that do not distil at the ordinary pressure, or solid crystalline bodies. They form with acids, stable salts which are generally soluble in water. The new compounds are applicable for technical and therapeutic purposes.

The following examples illustrate the invention, the parts being by weight:—

Example 1.

25 parts of unsymmetrical diethylethylenediamine are dissolved in 35 parts of glacial acetic acid and the solution is mixed with 25 parts of acetic anhydride. After the heat developed by the reaction is dissipated the glacial acetic acid is distilled in a vacuum, and the residue after having been washed with potassium carbonate solution and dried is fractionated in a vacuum. The monoacetylderivative is a yellowish oil which boils at 137–138° C. under 12 millimeters pressure; it is insoluble in water and easily soluble in the usual organic solvents.

Example 2.

252 parts of linoleic acid are heated with 116 parts of unsymmetrical diethylethylenediamine for six hours in an autoclave or in the open at 180–200° C. There remains a thick oil which is insoluble in water but easily soluble in the usual organic solvents.

*Example 3.*

25 parts of stearic acid are heated with 10 parts of ethylenediamine-hydrate for six hours in a closed vessel or in a reflux apparatus to 180–200° C. The product of the reaction is triturated with cold alcohol and the di-stearyl-ethylenediamide which remains undissolved is separated by filtration. The filtrate is evaporated and the residue is crystallized from acetone. A crystalline mass having a basic odor and melting at 103° C. is obtained. The monostearyl-ethylenediamine dissolves in water to a turbid, strongly alkaline liquid.

*Example 4.*

25 parts of oleic acid are caused to react with 10 parts of ethylenediamine-hydrate as described in Example 3. By triturating the buttery product of the reaction with acetone and filtering, the di-oleylethylenediamide is separated. From the filtrate, after evaporating the acetone, there is obtained mono-oleylethylenediamide which is liquid at the ordinary temperature and dissolves in water to a strong alkaline solution.

*Example 5.*

25 parts of olive oil are boiled for some hours in a reflux apparatus with 12 parts of propylenediamine-hydrate. By triturating the semi-fluid product of the reaction with cold acetone and filtering, a small quantity of the diacyl product is separated. By evaporating the acetone from the filtrate, there is obtained a mixture of stearyl-, palmityl- and oleyl-propylenediamide; this has a buttery consistence and properties of solubility similar to those of the products obtained as described in Examples 3 and 4.

*Example 6.*

14.1 parts of oleic acid are heated with 6.5 parts of ω-amino-N-ethylpiperidine for four hours at 180–200° C. The oleyl-piperidyl-N-ethylamide is an oil insoluble in water, soluble in organic solvents and incapable of distillation at ordinary pressure.

*Example 7.*

To a solution of six parts of unsymmetrical dimethylethylenediamine in 50 parts of benzene, 10 parts of stearylchloride dissolved in some benzene are added and after evaporating the benzene the residue is crystallized from a mixture of acetone and water. The stearyl-dimethylethylenediamide forms crystals which melt at 71° C. They are insoluble in water and soluble in organic solvents.

*Example 8.*

282 parts of oleic acid are heated with 136 parts of N-phenyl-ethylenediamine (Gabriel Ber. der deutschen chem. Ges. 22, p. 2223) for 10 hours in an autoclave to 200–210° C. The product of the reaction is freed, by warming in a vacuum, from the water formed, the oleyl-phenyl-ethylenediamide being thus obtained as a thick oil which is incapable of distillation at ordinary pressure. Its salts with mineral acids are waxlike and insoluble in water.

*Example 9.*

282 parts of oleic acid and 116 parts of unsymmetrical diethylethylenediamine are heated together for 10 hours in the open or in a closed vessel to 200–220° C. The product of the reaction is then heated in a vacuum at 100° C. whereby the formed water distils off and the oleyl-diethylethylenediamide remains as an oil that is incapable of distillation at ordinary pressure. It is insoluble in water but soluble in organic solvents.

The hydrochloride, silicofluoride, citrate, lactate, benzoate, p-chlorobenzoate, salicylate are thick oils which are soluble in water.

*Example 10.*

One molecular weight of the fatty acids of cod-liver oil (calculated with reference to the acid group) are caused to react with 116 parts of unsymmetrical diethylethylenediamine as described in Example 9. The base is a thick oil. The hydrochloride and the tartrate are thick oils which are soluble in water.

What we claim is:

1. As new products the acylated alkylenediamines of the general formula:

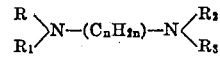

(wherein R means H or acyl, $R_1$ means acyl, $R_2$ and $R_3$ mean H or a hydrocarbon radical, $n$ means a whole number) which products form with acid salts which are soluble in water.

2. As new products the acylated ethylenediamines of the general formula:

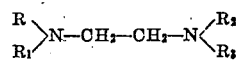

(wherein R means H or acyl, $R_1$ means acyl, $R_2$ and $R_3$ mean H or a hydrocarbon radical) which products form with acids salts which are soluble in water.

3. As new products the acyl-derivatives of unsymmetrical di-substituted alkylenediamines of the general formula:

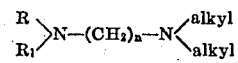

(wherein R means H or acyl, $R_1$ means acyl, $n$ means a whole number) which products form with acids salts which are soluble in water.

4. As new products the acyl-derivatives of asymmetrical di-substituted alyklenediamines of the general formula:

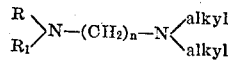

(wherein R means H or the radical of a higher aliphatic acid, $R_1$ means the radical of a higher aliphatic acid, $n$ means a whole number) which products form with acids salts which are soluble in water.

5. As a new product the mono-oleyl-diethylethylenediamine of the formula

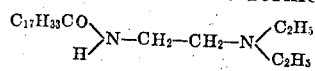

which constitutes a thick oil which does not distil at ordinary pressure and is insoluble in water, soluble in organic solvents, and which forms with hydrochloric acid, silicofluoric acid, citric acid, benzoic acid, p-chloro-benzoic acid, salicylic acid, and other acids salts that constitute thick oils and are soluble in water.

In witness whereof we have hereunto signed our names this 20th day of June, 1924, in the presence of two subscribing witnesses.

MAX HARTMANN.
JOHANN KÄGI.

Witnesses:
  MADELEINE SPENGLER,
  AMAND BROUN.